(12) United States Patent  
Bianco

(10) Patent No.: US 9,120,391 B2  
(45) Date of Patent: Sep. 1, 2015

(54) SECURITY SYSTEM FOR ELECTRIC VEHICLE CHARGING EQUIPMENT

(75) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 788 days.

(21) Appl. No.: 13/369,692

(22) Filed: Feb. 9, 2012

(65) Prior Publication Data

US 2012/0262114 A1 Oct. 18, 2012

Related U.S. Application Data

(60) Provisional application No. 61/474,464, filed on Apr. 12, 2011.

(51) Int. Cl.
*H02J 7/00* (2006.01)
*B60L 11/18* (2006.01)

(52) U.S. Cl.
CPC ............ *B60L 11/1824* (2013.01); *H02J 7/0042* (2013.01); *B60L 2270/34* (2013.01); *Y02T 10/7005* (2013.01); *Y02T 90/12* (2013.01); *Y02T 90/121* (2013.01); *Y02T 90/14* (2013.01)

(58) Field of Classification Search
CPC ....... H02J 7/0042; Y02T 90/12; Y02T 90/14; B60L 2270/34
USPC ......................................... 320/104, 107, 109
See application file for complete search history.

(56) References Cited

U.S. PATENT DOCUMENTS

| | | | |
|---|---|---|---|
| 2010/0013433 A1* | 1/2010 | Baxter et al. | 320/109 |
| 2010/0228405 A1* | 9/2010 | Morgal et al. | 701/2 |
| 2011/0174875 A1* | 7/2011 | Wurzer | 235/380 |

* cited by examiner

*Primary Examiner* — Edward Tso
*Assistant Examiner* — Aaron Piggush
(74) *Attorney, Agent, or Firm* — Alix, Yale & Ristas, LLP

(57) ABSTRACT

A security enclosure is adapted to receive and secure portable charging equipment for supplying power from a standard outlet to charge an electric vehicle. The security enclosure is mounted to a wall and houses the portable charging equipment. The equipment connects with an outlet mounted on the wall. In a locked condition, the enclosure secures the portable charging module and has an access opening which allows the power cord to extend exteriorly of the enclosure for charging the electric vehicle.

19 Claims, 5 Drawing Sheets

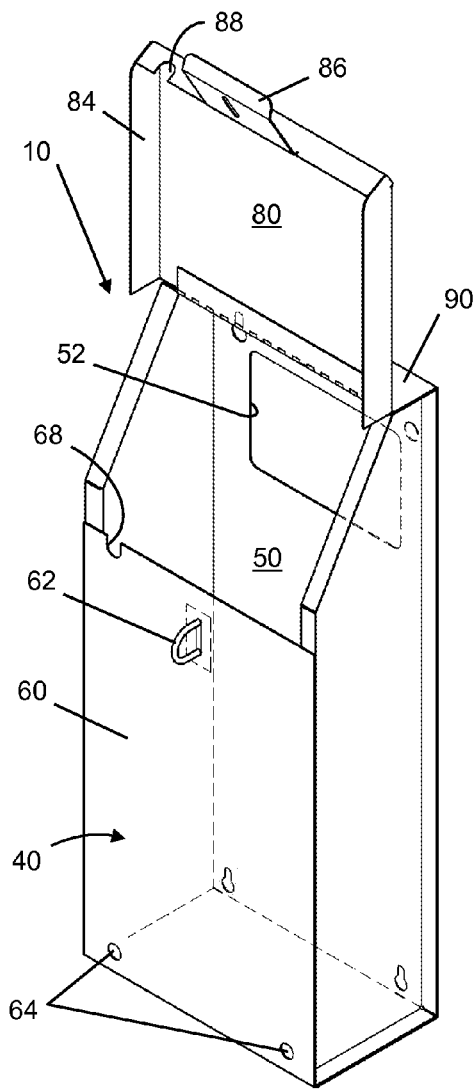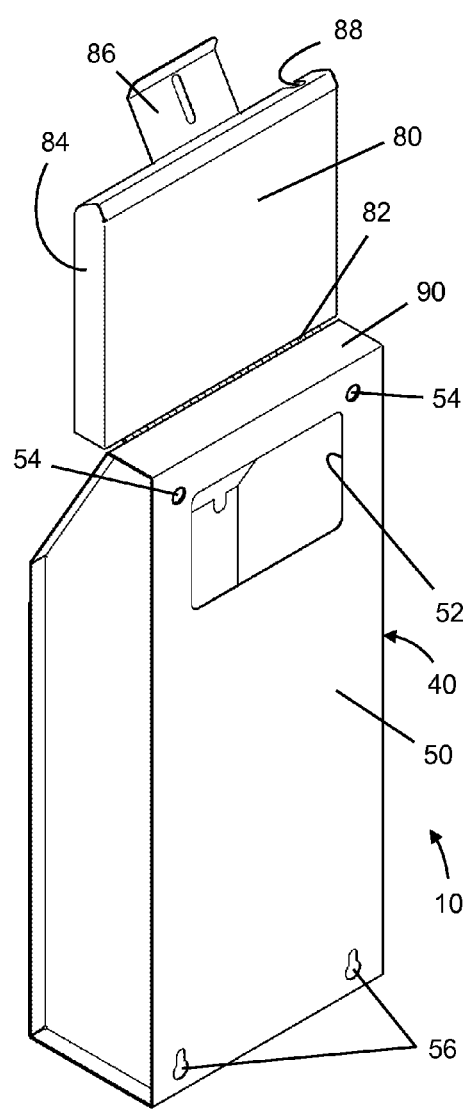
FIG. 2A
FIG. 2B

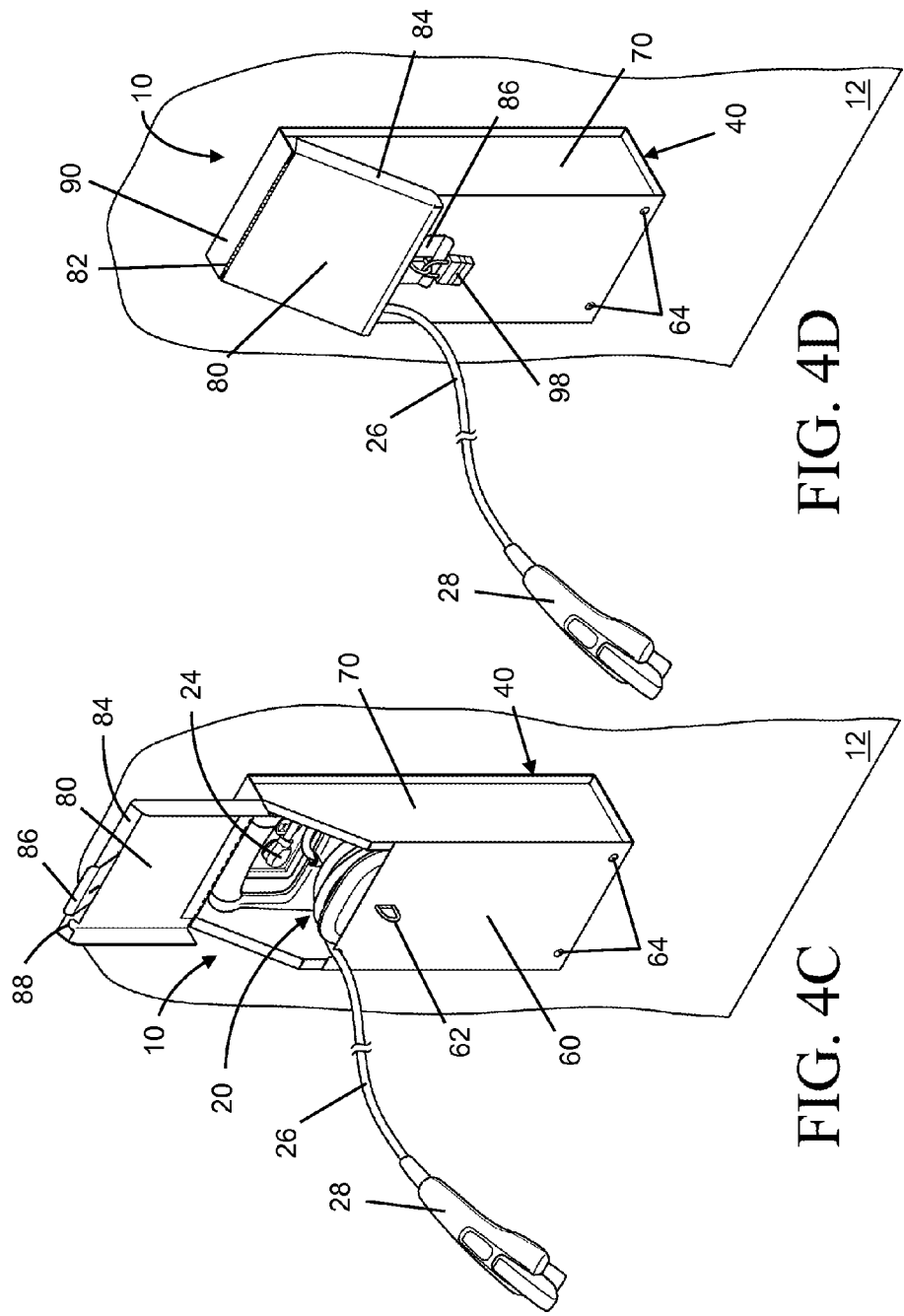

SECURITY SYSTEM FOR ELECTRIC VEHICLE CHARGING EQUIPMENT

CROSS REFERENCE TO RELATED APPLICATION

This application claims priority the priority of U.S. Provisional Patent Application No. 61/474,464 filed on Apr. 12, 2011, the disclosure of which is incorporated by reference in its entirety.

BACKGROUND

This disclosure relates generally to charging equipment for charging the battery supply of an electric vehicle. More particularly, this disclosure relates to devices and methods for ensuring the security of portable electric charging equipment for charging an electric vehicle.

The increasing popularity of electric vehicles has resulted in a dramatic increase in public electrical outlets to charge the vehicles. In order to facilitate the charging of the electric vehicle, it is common for the electric vehicle to be supplied with portable charging equipment to easily and efficiently make use of various facilities. The portable charging equipment typically includes an adapter that plugs into a standard 120 VAC outlet, a conversion module, a power cord and a connector wherein the cord and the connector meet the new J1772 standard for electric vehicles.

Many private and government agencies are taking steps to encourage the use of electric vehicles by installing electric outlets in public parking areas, garages and other facilities. However, an issue with supplying power from standard electric outlets is the lack of security. Older electric vehicles typically employed a connector which was essentially a simple 120 VAC extension cord and had little monetary value. However, the recent portable charging equipment with a conversion module and the J1772 cord and connector can be significantly more expensive and may approach a thousand dollars or more. Consequently, to charge electric vehicles employing portable charging equipment in a public area without security for extended periods of time may be problematic from a security standpoint.

SUMMARY

Briefly stated, a security enclosure for portable charging equipment for an electric vehicle comprises a housing having a front panel and a rear mounting panel. The housing also includes a cover which is movable between an opened and a closed position. Hardware is mounted to the housing for receiving a lock to lock the cover in a closed position. The rear mounting panel defines an access opening for an electrical outlet. The rear mounting panel also defines two openings each for receiving a fastener to mount the rear panel to a vertical structure. The housing defines an access passageway for a cord when the cover is disposed in the locked position.

The housing is preferably manufactured from metal or high impact plastic. The access passageway is partially defined by access slots in the cover and in the front panel. A lock engages the hardware to lock the cover in the closed position.

The portable charging equipment comprises a conversion module having a power cord which terminates in a connector. The conversion module is fully received in the housing when the cover is closed. The access passageway allows the cord to exteriorly extend from the housing. The power cord passes through access slots in the housing. The security enclosure is mounted to an upright structure with an electrical outlet. The outlet is accessible at the interior of the housing. Fasteners mount the housing to the structure. When the housing is in the closed locked position, the mounting fasteners are not accessible from the housing exterior. The electrical outlet has a plate disposed at the outlet opening.

Portable charging equipment for an electric vehicle comprises a module with a power cord and a connector. A housing houses the module. The housing has a front panel and a rear mounting panel and a cover movable between an opened and a closed position, securing the module in the housing. Hardware mounted to the housing receives a lock to lock the cover in the closed position. The rear mounting panel defines an access opening for an outlet and at least two fastener openings. An access passageway is defined in the housing to allow passage of the cord exteriorly of the housing when the cover is in the closed position. The module is fully housed in the housing in the closed position. Each fastener opening is preferably configured as a bifurcated slot.

A secure installation for portable charging equipment for an electric vehicle comprises a wall with an electrical outlet. A security enclosure is mounted to the wall and houses the module of the portable charging equipment. The enclosure includes a housing having a cover pivotal between an opened and a closed position. Hardware is mounted to the housing for receiving a lock to lock the cover in a closed position. The rear mounting panel defines an access opening at said electrical outlet and has at least two openings each for receiving a fastener which mounts the rear panel to the wall. The housing also defines an access passageway for a cord of the charging equipment when the cover is in the closed position. The charging equipment electrically connects with the outlet. The mounting fasteners are not accessible from the housing exterior when the charging equipment is received in the housing and the cover is locked. A lock engages the hardware to lock the cover in the closed position.

BRIEF DESCRIPTION OF THE DRAWINGS

FIG. 2A is a perspective view, partly in phantom, of the security enclosure of FIG. 1A with the cover thereof being illustrated in an open position;

FIG. 2B is a rear perspective view of the security enclosure of FIG. 2A with the cover in an open position;

FIG. 4C is a perspective view of the portable charging equipment as received in the open mounted security enclosure; and FIG. 4D is a perspective view of the portable charging equipment as locked into the mounted security enclosure for usage in charging an electric vehicle.

DETAILED DESCRIPTION

Figures 1A, 1B:
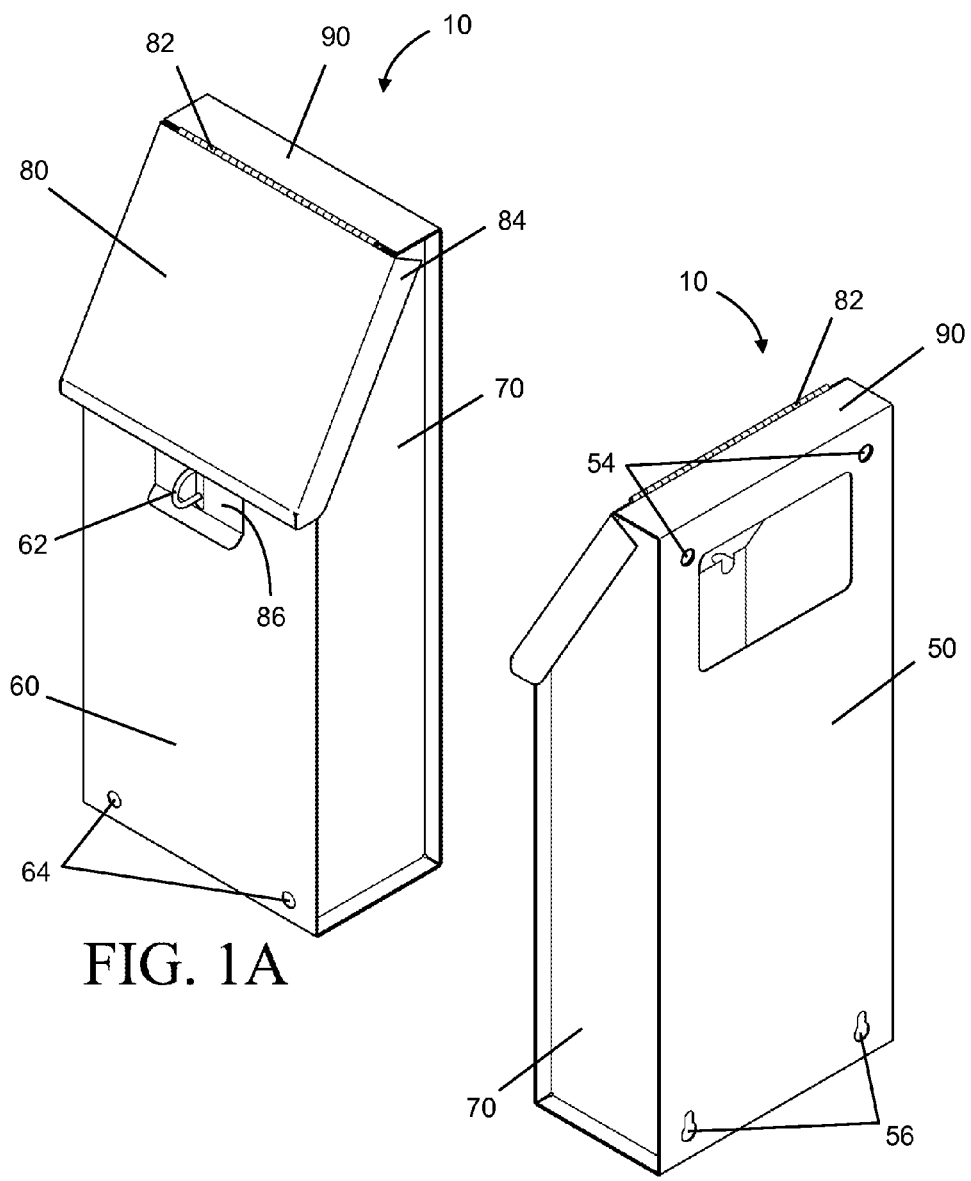
FIG. 1A is a perspective view of a security enclosure for portable charging equipment for an electric vehicle.
FIG. 1B is a rear perspective view of the security enclosure of FIG. 1A.
Figure 3:
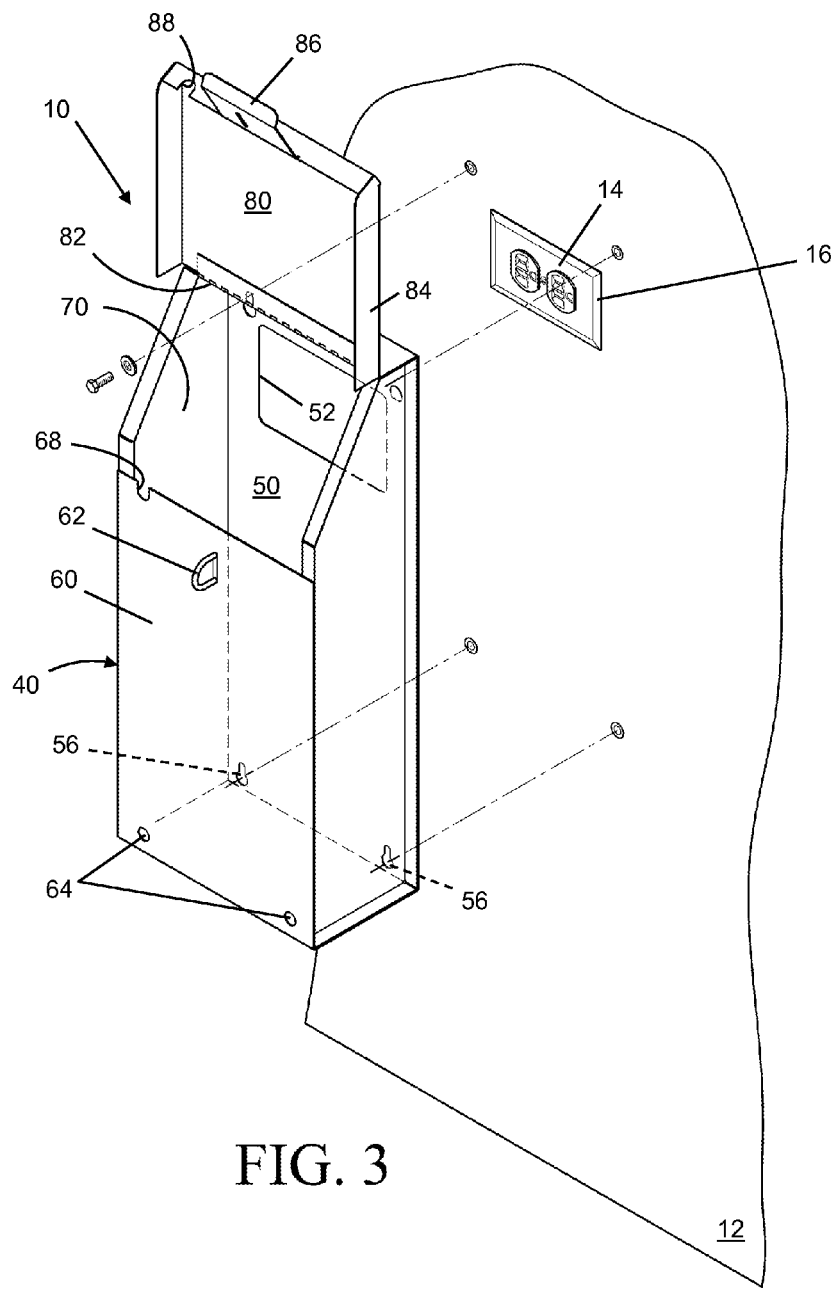
FIG. 3 is a perspective view, partly in schematic and partly in phantom, of the security enclosure of FIG. 1A illustrating its installation into a wall having an electrical outlet.

With reference to the drawings wherein like numerals represent like parts throughout the figures, a security enclosure is generally designated by the numeral 10. The security enclosure 10 is adapted to mount to a wall 12 which has an electrical outlet 14. The electrical outlet 14 is typically a dual plug outlet of conventional form which provides 120 VAC service and has a frame plate 16.

The security enclosure is adapted to receive and secure portable charging equipment 20 for supplying power from a standard outlet to charge an electric vehicle. The equipment comprises a conversion module 22 with an inlet/cord adapter 24, a power cord 26 and a J1772 connector 28. The conversion module may typically assume numerous forms and may include a carrying handle 30. An inlet/cord adapter 24 plugs into a conventional wall outlet. The front face 32 of the conversion module typically has various controls and screen displays. The body of the module is typically configured so that the power cord 26 may be retainably wrapped around the exterior sides thereof as, for example, illustrated in FIG. 4A.

Figure 4A:
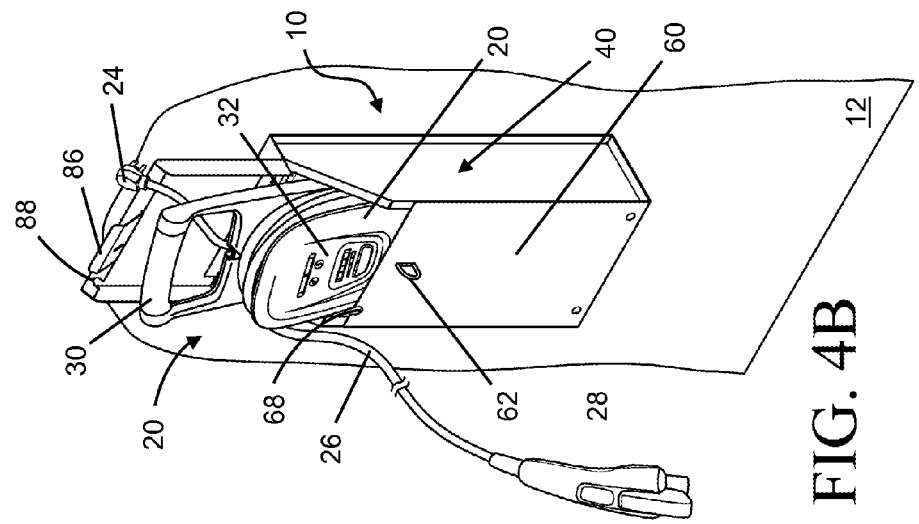
FIG. 4A is a perspective view, partly in schematic, of portable charging equipment in connection with an open mounted security enclosure.
Figure 4B:
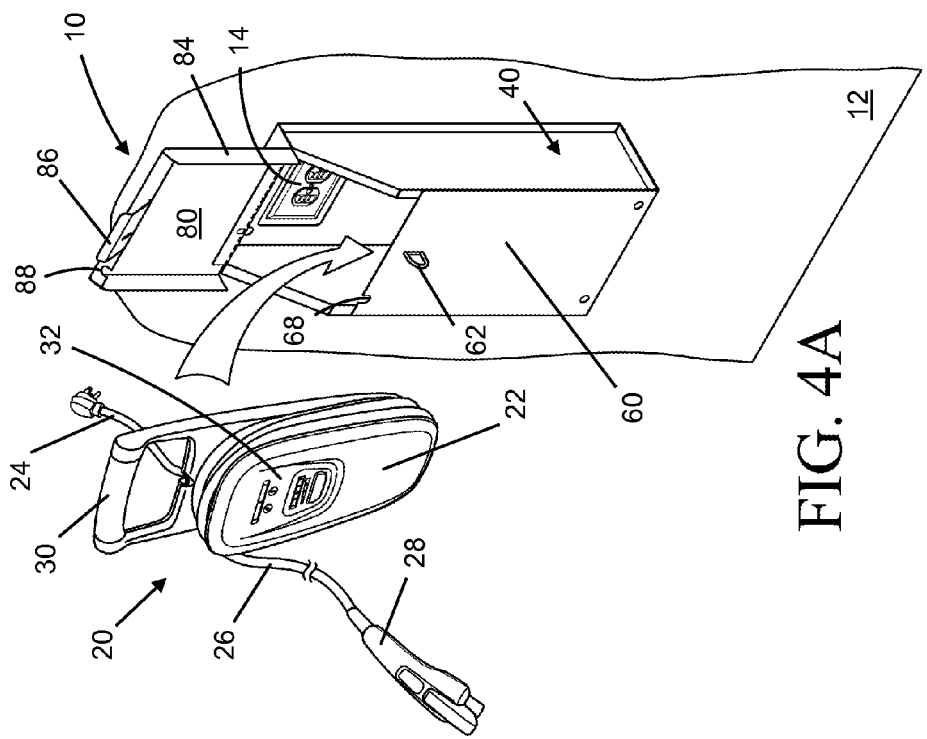
FIG. 4B is a perspective view further illustrating the placement of portable charging equipment into the open mounted security enclosure.

The security enclosure 10 is typically manufactured from metal or high impact plastic and has a rugged impact resistant construction. The enclosure includes a housing 40 having a rear mounting panel 50 which has a rectangular opening 52 generally complementary with the electrical outlet plate 16 of the electrical outlet 14. A pair of laterally spaced openings 54 are disposed at an upper portion of the rear panel for receiving fasteners for mounting the rear panel in surface-to-surface contact against the wall 12 so that the outlet plate 14 is positioned in or at the opening 52, as best illustrated in FIG. 4A. The rear panel 50 also includes a pair of laterally spaced bifurcated slots 56 near the bottom—each for receiving a mounting fastener.

The housing 40 includes a front panel 60 with a U-shaped lock pin 62 or other fastening/latching hardware. Two spaced openings 64 aligned with bifurcated openings 56 are formed at the bottom of the panel to provide access to fasteners and the working end of a screwdriver or driving tool (neither illustrated) for securing the lower portion of the rear panel 50 to the wall.

The opposed sides 70 of the housing in one embodiment are essentially identical trapezoidal shaped members. A cover 80 connects via a hinge 82 which extends across a front portion of a strip-like top 90. The cover 80 has a peripheral covering flange 84. The cover centrally mounts a hasp 86 which cooperates with the lock pin 62 when the cover is downwardly moved to a closed position.

The front panel includes a slot 68 which is diametrically dimensioned to receive the power cord 26, as illustrated in FIG. 4C. In addition, the peripheral flange 86 of the cover includes a slot 88 which aligns with slot 68 and is also diametrally dimensioned to receive the power cord 26.

The housing 40 is dimensioned and adapted to fully receive the conversion module 22 with the inlet cord/adapter 24 being connected to the outlet 14. The power cord 26 is unwound to a sufficient length to accommodate the connecting distance to the electric vehicle. The power cord is placed in the slots 68, 88 so that the cord is extendable from the enclosure, as illustrated in FIG. 4D.

With reference to FIG. 4D, the cover 80 is then closed and the cooperative latching hardware engaged. A padlock 98 or other lock is preferably passed through the lock pin 62 to lock the hasp 86 and the cover 80 in the closed position while the power cord 26 extends exteriorly from the security enclosure. Naturally, the power cord is unwound a sufficient distance so that the J1772 connector 28 may be connected with the electric vehicle (not illustrated).

The electric vehicle charging equipment is typically supplied by the vehicle operator. It will be appreciated that while the power cord 26 and J1772 connector 28 is employed to charge the vehicle, the conversion module 22 and a proximal portion of the power cord 26 will be fully locked and received in a secure receptive configuration within the locked security enclosure 10. The lock, which may assume numerous forms, is also typically supplied by the vehicle operator. The vehicle operator may then lock the enclosure 10 while the vehicle is being charged in a public location and unlock the lock to remove the portable charging equipment 20 from the security enclosure when the charging is complete.

In some embodiments, a lock mechanism is pre-installed for locking the cover in the closed position. The lock mechanism may be of numerous forms, such as an electronic, a combination or a control key operated lock. In such embodiments, the lock mechanism remains with the secured enclosure unit when the charging equipment is removed by the vehicle operator from the site.

While preferred embodiments of the foregoing disclosure have been set forth for the purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A security enclosure for portable charging equipment for an electric vehicle comprising:
   a housing having a front panel and a rear mounting panel and a cover which is movable between an open and a closed position;
   hardware mounted to said housing and receiving a lock to lock said cover in the closed position;
   said rear mounting panel defining an access opening for an electrical outlet and at least two openings each for receiving a fastener to mount said rear panel to a vertical structure;
   portable charging equipment comprising a conversion module having a power cord terminating in a connector wherein said conversion module is fully received in said housing when said cover is in the closed position; and
   said housing defining an access passageway for the cord when said cover is disposed in the closed position.

2. The security enclosure of claim 1 wherein said housing is manufactured from metal.

3. The security enclosure of claim 1 wherein said housing is manufactured from high impact plastic.

4. The security enclosure of claim 1 wherein said access passageway is partially defined by access slots in said cover and said front panel.

5. The security enclosure of claim 1 further comprising a lock for engaging said hardware to lock the cover in the closed position.

6. The security enclosure and equipment of claim 1 wherein said access passageway allows the cord to exteriorly extend from the housing.

7. The security enclosure and equipment of claim 4 wherein said power cord passes through said access slots in said housing.

8. The security enclosure of claim 1 further comprising an upright structure with an electrical outlet and wherein said security enclosure is mounted to said structure and said outlet is accessible at the interior of the housing.

9. The security enclosure and structure mount configuration of claim 8 wherein fasteners mount said enclosure to said structure and when the housing is in the closed locked position, the mounting fasteners are not accessible from the housing exterior.

10. The security enclosure and structure mount configuration of claim 9 wherein said electrical outlet has a plate disposed at said outlet opening.

11. A security enclosure and portable charging equipment for an electric vehicle comprising:
- portable charging equipment comprising a module with a power cord and a connector;
- a housing enclosing said module and having a front panel and rear mounting panel and a cover which is movable between an open and a closed position securing said module in said housing wherein said module is fully received in said housing;
- hardware mounted to said housing and receiving a lock to lock said cover in the closed position;
- said rear mounting panel defining an access opening for an electrical outlet; and
- an access passageway defined in said housing to allow passage of said cord exteriorly of the housing when said cover is in the closed position.

12. The security enclosure and equipment of claim 11 wherein said access passageway is partially defined by access slots in said cover and said front panel.

13. The security enclosure and equipment of claim 11 further comprising a lock for engaging said hardware to lock the cover in the closed position.

14. The security enclosure and equipment of claim 13 wherein said module is fully housed in the housing in the closed position.

15. The security enclosure and equipment of claim 11 and wherein said rear panel defines at least two fastener openings wherein each said fastener opening is defined by a bifurcated slot.

16. A secure installation for portable charging equipment for an electric vehicle comprising:
- portable charging equipment comprising a module with a power cord and a connector;
- a wall with an electrical outlet; and
- a security enclosure mounted to said wall and housing said module comprising:
  - a housing mounted to said wall and having a front panel and a rear mounting panel and a cover which is pivotal between an open and a closed position;
  - hardware mounted to said housing and receiving a lock to lock said cover in the closed position;
  - said rear mounting panel defining an access opening at said electrical outlet and at least two openings each receiving a fastener which mounts said rear panel to said wall; and
- portable charging equipment comprising a conversion module having a power cord terminating in a connector wherein said conversion module is fully received in said housing when said cover is closed; and
- said housing defining an access passageway for the cord when said cover is in the closed position.

17. The secure installation of claim 16 wherein said outlet is accessible at the interior of the housing and said module electrically connects to said outlet.

18. The secure installation of claim 16 wherein when the housing is in the closed locked position, the mounting fasteners are not accessible from the housing exterior.

19. The secure installation of claim 16 wherein a lock engages said hardware to lock said cover in a closed position.

* * * * *